United States Patent
Ihne et al.

(10) Patent No.: US 10,753,401 B2
(45) Date of Patent: Aug. 25, 2020

(54) METHOD FOR PRODUCING A ROLLER BEARING

(71) Applicant: Mahle Internatioanl GmbH, Stuttgart (DE)

(72) Inventors: Thorsten Ihne, Stuttgart (DE); Mario Mohler, Stuttgart (DE)

(73) Assignee: MAHLE INTERNATIONAL GMBH (DE)

( * ) Notice: Subject to any disclaimer, the term of this patent is extended or adjusted under 35 U.S.C. 154(b) by 45 days.

(21) Appl. No.: 16/027,258

(22) Filed: Jul. 3, 2018

(65) Prior Publication Data

US 2019/0010990 A1 Jan. 10, 2019

(30) Foreign Application Priority Data

Jul. 4, 2017 (DE) .......................... 10 2017 211 385

(51) Int. Cl.
*F16C 43/02* (2006.01)
*F16C 17/02* (2006.01)
(Continued)

(52) U.S. Cl.
CPC .............. *F16C 43/02* (2013.01); *F01L 1/047* (2013.01); *F01L 1/18* (2013.01); *F16C 13/006* (2013.01); *F16C 17/02* (2013.01); *F16C 33/06* (2013.01); *F16C 33/121* (2013.01); *F16C 33/14* (2013.01); *F01L 2001/0476* (2013.01);
(Continued)

(58) Field of Classification Search
CPC .... F16C 43/02; F16C 2360/18; F16C 13/006; F16C 33/06; F16C 33/14; F16C 17/02; F16C 33/121; F16C 2204/52; F16C 2204/10; F16C 2204/50; F16C 2204/34; F16C 2204/32; F01L 2105/00; F01L 2001/0476; F01L 1/12; F01L 1/18; F01L 1/047; F01L 2103/01; F01L 2101/00; B21D 53/10; B21D 19/00; B21D 19/08
USPC ............... 29/898, 898.04, 898.042, 898.054, 29/898.07, 592, 446, 447, 428
See application file for complete search history.

(56) References Cited

U.S. PATENT DOCUMENTS 3,684,334 A * 8/1972 Kohler ..................... D01H 7/10
  384/226
5,433,100 A * 7/1995 Easterbrook ............ B23P 9/025
  29/446

(Continued)

FOREIGN PATENT DOCUMENTS

DE 19944674 A1 4/2001

*Primary Examiner* — Sarang Afzali
*Assistant Examiner* — Darrell C Ford
(74) *Attorney, Agent, or Firm* — Fishman Stewart PLLC

(57) ABSTRACT

A method for producing a roller bearing may include threading a cam roller onto a bearing sleeve until the cam roller abuts a first axial flange of the bearing sleeve and inserting a counter holder into the bearing sleeve until the first axial flange of the bearing sleeve abuts a stop of the counter holder. The method may also include heating the bearing sleeve and forming an opposite second axial flange via inserting a forming punch into the bearing sleeve after heating the bearing sleeve. The second axial flange may be formed such that the cam roller is held in the bearing sleeve with radial play and axial play after the bearing sleeve cools down. The method may further include removing the forming punch and the counter holder from within the bearing sleeve.

10 Claims, 2 Drawing Sheets

(51) Int. Cl.
  *F01L 1/047*  (2006.01)
  *F16C 33/12*  (2006.01)
  *F01L 1/18*  (2006.01)
  *F16C 13/00*  (2006.01)
  *F16C 33/06*  (2006.01)
  *F16C 33/14*  (2006.01)

(52) U.S. Cl.
  CPC ....... *F01L 2101/00* (2013.01); *F01L 2103/01* (2013.01); *F01L 2105/00* (2013.01); *F16C 2204/10* (2013.01); *F16C 2204/32* (2013.01); *F16C 2204/34* (2013.01); *F16C 2204/50* (2013.01); *F16C 2204/52* (2013.01); *F16C 2360/18* (2013.01)

(56) References Cited

U.S. PATENT DOCUMENTS

| | | | |
|---|---|---|---|
| 6,648,512 B1 | 11/2003 | Storch et al. | |
| 7,979,967 B2* | 7/2011 | Schmidt | B21J 15/02 29/11 |
| 2004/0078977 A1* | 4/2004 | Kirchhof | B21D 11/08 29/898.057 |
| 2006/0059689 A1* | 3/2006 | Kagata | F16C 17/02 29/898.02 |
| 2007/0277346 A1* | 12/2007 | Schmidt | B21J 15/02 16/226 |
| 2008/0075402 A1* | 3/2008 | Hewitt | F16C 35/073 384/538 |
| 2009/0279211 A1* | 11/2009 | Seymour | G11B 5/4813 360/265.6 |
| 2020/0031032 A1* | 1/2020 | Bittendorf | B29C 45/14 |

* cited by examiner

METHOD FOR PRODUCING A ROLLER BEARING

CROSS-REFERENCE TO RELATED APPLICATIONS

This application claims priority to German Patent Application No. DE 10 2017 211 385.5 filed on Jul. 4, 2017, the contents of which are incorporated herein by reference in its entirety.

TECHNICAL FIELD

The present invention relates to a method for producing a roller bearing. The invention also relates to a roller bearing produced according to this method as well as to a valve drive of an internal combustion engine comprising such a roller bearing.

BACKGROUND

Valve drives in internal combustion engines serve to control inlet and outlet valves as well as to transfer a rotating movement via a cam shaft into a linear movement, which opens the valves. For this purpose, valve drives typically have said cam shaft as well as a cam follower, which is in operative connection with a corresponding cam of the cam shaft. The cam follower thereby typically comprises a cam roller, which is rotatably supported on a bearing bolt. For a long-term flawless operation, it is thereby required to rotatably secure the cam follower, that is the cam roller, on the bearing bolt at least in a smooth-running manner. If an axial securing does not take place by means of axial position limiting as a result of corresponding elements, which accommodate the bearing bolt, an axial securing on the bearing bolt is required. For the purpose of the axial securing of the cam roller, so-called snap rings, which engage with corresponding grooves on the bearing bolt, have thereby typically been used so far in this case. However, the fastening of these snap rings thereby requires a mounting effort, which must not be underestimated, and can furthermore cause scratches on the bearing bolt, which can impact the function. For the rotatable support of the cam roller on the bearing bolt, provision needs to additionally either be made for a comparatively expensive ball bearing or the bearing bolt needs to be made of a slide bearing material or needs to be coated with a corresponding slide bearing layer, respectively, which is also comparatively extensive and expensive.

SUMMARY

The present invention thus deals with the problem of specifying a method for producing a roller bearing, which overcomes the disadvantages known from the prior art.

According to the invention, this problem is solved by means of the subject matter of the independent claim(s). Advantageous embodiments are the subject matter of the dependent claim(s).

The present invention is based on the general idea of managing the entire support of a cam roller of a cam follower on a bearing bolt by means of a bimetal cam roller. In this case, "bimetal cam rollers" are to mean that the actual cam follower, that is the cam roller, is made of a first metallic material, while a bearing sleeve is made of a second metallic material. The roller bearing according to the invention is thereby produced by means of the following method steps: Providing a cam roller and a bearing sleeve with a first axial flange. This means that the bearing sleeve has a cylinder section and a collar, which is formed radially to the outside at a longitudinal end region, and which forms the axial flange. The cam roller is subsequently threaded onto the bearing sleeve, that is, the bearing sleeve is guided through the bearing opening of the cam roller. By inserting a counter holder into the bearing sleeve with a corresponding stop, the bearing sleeve can be secured, in that the counter holder is inserted into the bearing sleeve to the extent that said counter holder abuts with the stop on the first axial flange. The bearing sleeve can subsequently be heated, wherein in addition or in the alternative, a forming punch is inserted into the heated-up bearing sleeve from the opposite side with respect to the counter holder, and a forming punch is inserted into the in particular heated-up/heated bearing sleeve, and a second axial flange, which is located opposite the first axial flange, is created by means of the forming punch. As a result of the heated-up or heated material, respectively, of the bearing sleeve, the latter can be formed better, that is, the second axial flange can be produced more easily. The forming of the bearing sleeve thereby takes place in such a way that the cam roller is held in the bearing sleeve with axial play and radial play after the cool-down of the bearing sleeve. In general, the forming can also take place at room temperature. As a result of the heating, however, there is also the option to adjust the play by utilizing the different heat expansion coefficients. The two axial flanges of the bearing sleeve engage around an inner edge of the cam roller and represent the later axial securing of the cam roller. As a result of the axial play and the radial play, the cam roller is also rotatably supported with respect to the bearing sleeve after the cool-down. In the further use, a roller bearing produced in this way makes a bearing bolt of a slide bearing material as well as a coating of a conventional bearing bolt with a slide bearing material expendable and furthermore provides for the elimination of axial securing means, which are required so far, whereby a particularly cost- and mounting-optimized solution can be attained.

In an advantageous further development of the solution according to the invention, the roller bearing is secured on a bearing bolt in a thermal manner or by means of a force fit. The thermal securing of the roller bearing on the bearing bolt can thereby take place by heating the roller bearing and/or by cooling down the bearing bolt. It goes without saying that, in the alternative, a connecting by means of a substance-to-substance bond using adhesion welding or soldering is also conceivable. If the roller bearing is heated and/or if the bearing bolt is cooled down, the roller bearing can be threaded onto the bearing bolt and a temperature compensation can be effected. After the cool-down of the roller bearing and/or after the heating of the bearing bolt, the latter expands or the bearing sleeve of the roller bearing contracts, respectively, whereupon the bearing sleeve is secured on the bearing bolt in a rotatably fixed manner A rotatable support of the cam roller on the bearing sleeve and thus also relative to the bearing bolt is nonetheless at hand as a result of the axial and radial play, which exists between the bearing sleeve and the cam roller. The first and the second axial flange thereby represent the axial securing of the cam roller of the cam follower with respect to the bearing bolt. A valve drive comprising such a roller bearing can thus be created in this way, in the case of which neither the bearing bolt needs to be made of an expensive slide bearing material, nor does it need to be coated therewith, nor would a currently required mounting of snap rings be required for the axial securing of the cam roller of the cam follower. The advantages thus lie in a comparatively simple mounting without snap ring and thus also without scratches and without additional mounting or space requirement, respectively, and in the use of a cost-efficient material for the bearing bolt In an advantageous further development of the solution according to the invention, a 100Cr6 steel is used for the cam roller. A so-called Saarstahl 100Cr6 is a typical roller bearing steel and thus has a high wear resistance. Such a steel is typically also hardened prior to the use.

Advantageously, a non-ferrous metal is used for the bearing sleeve. Non-ferrous metal is thereby a collective term for a subgroup of the non-ferrous metals excluding the precious metals. For example, copper, cobalt, cadmium, tin, zinc, nickel as well as alloys thereof are possible as non-ferrous metal for the bearing sleeve. Depending on the used alloy components, individually required properties can be created thereby.

The present invention is further based on the general idea of providing a roller bearing produced according to the above-described method, in which the cam roller of the cam follower is held in the bearing sleeve with radial play and axial play. Such a roller bearing can thereby be supplied as already prefabricated component to a further mounting process and can be thermally joined to a bearing bolt of a valve drive of an internal combustion engine, for example by means of a simple thermal joining method. In particular roller bearings, which are currently required, and also axial securing means, such as, for example snap rings, can be forgone completely by means of such a roller bearing.

The present invention is further based on the general idea of equipping a valve drive of an internal combustion engine with such a roller bearing, wherein the roller bearing consists of the cam roller and the bearing sleeve, and is in particular thermally joined on a bearing bolt of the valve drive of the internal combustion engine. Compared to valve drives, which are currently known from the prior art, such a valve drive can be produced significantly more easily, namely without requiring for example snap rings for axially securing the cam roller and without having to use a slide bearing material for the bearing bolt or having to at least partially coat said bearing bolt with such a bearing material. As a whole, the valve drive according to the invention can thus be offered more cost-efficiently, but nonetheless of a high quality.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically

DETAILED DESCRIPTION

Figure 1A:
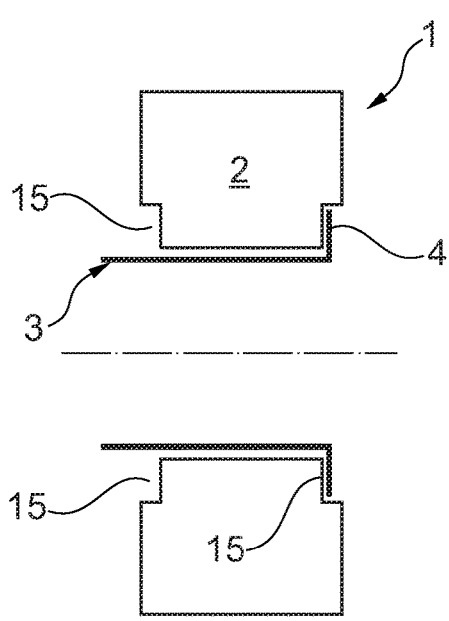
FIGS. 1A, 1B, 1C, and 1D show different method steps for producing a roller bearing according to the invention and a valve drive according to the invention.
Figure 1B:
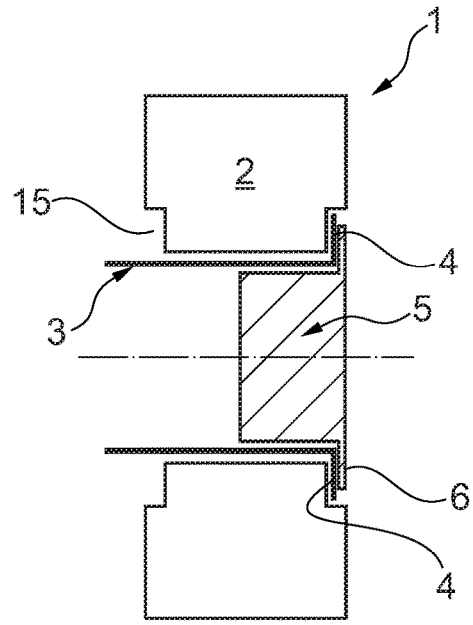
Figure 1C:
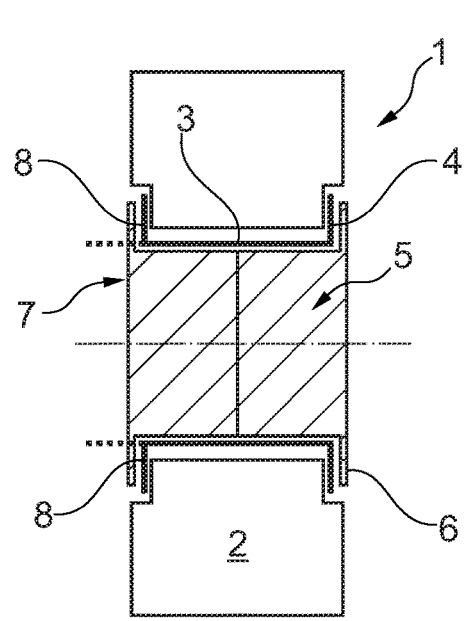
Figure 1D:
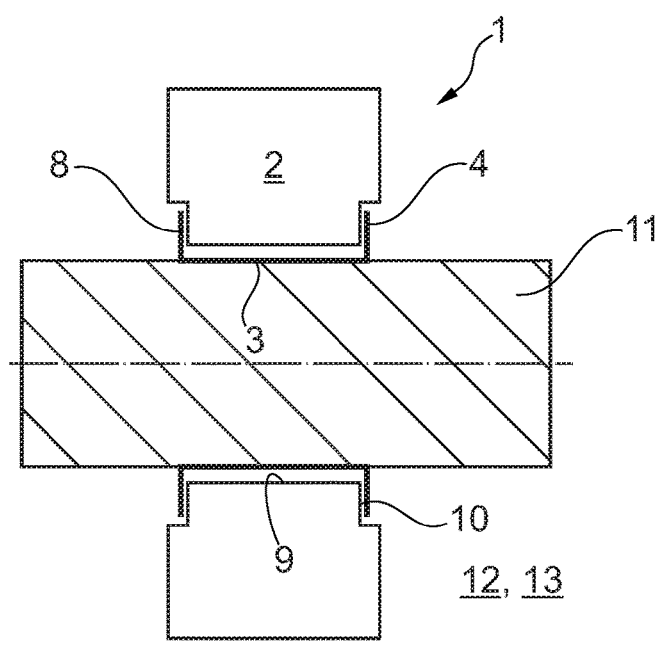

According to FIG. 1, a method for producing a roller bearing 1 is illustrated, wherein a cam roller 2 and a bearing sleeve 3 comprising a first axial flange 4 are provided in a first method step. The cam roller 2 is thereby in particular made of a roller bearing steel, for example a 100Cr6 steel. The bearing sleeve 3 is made of a non-ferrous metal, for example of copper, cadmium, lead, nickel, tin, zinc or an alloy thereof. According to FIG. 1A, the cam roller 2 is thereby threaded onto the bearing sleeve 3, until it abuts on the first axial flange 4. According to FIG. 1B, a counter holder 5 is inserted into the bearing sleeve 3, until it abuts with its first axial flange 4 on a stop 6 of the counter holder 5. Beforehand, simultaneously or subsequently, the bearing sleeve 3 can be heated, so as to facilitate the forming thereof. An insertion of a forming punch 7 into the in particular heated-up bearing sleeve 3, occurs subsequently, as it is illustrated according to FIG. 1C. By compressing the forming punch 7 and the counter holder 5, the edge section, which initially still sticks out in the axial direction, is formed radially to the outside into a second axial flange 8. The forming of the bearing sleeve 3 or of the second axial flange 8, respectively, thereby occurs in such a way that the cam roller 2 is held in the bearing sleeve 3 with radial play 9 (see FIG. 2) and with axial play 10. Upon conclusion of the forming, the forming punch 7 and the counter holder 5 are pulled out of the bearing sleeve 3. The roller bearing 1 has thus been completed and is ready for a mounting on a bearing bolt 11 of a valve drive 12 of an internal combustion engine 13 (see FIGS. 1D and 2).

A securing of the roller bearing 1 on the bearing bolt 11 thereby preferably takes place by means of thermal joining, for the purpose of which the bearing bolt 11 is cooled down and/or the roller bearing 1 is heated. After threading the roller bearing 1 onto the bearing bolt 11, a temperature compensation occurs, which effects a shrinking of the bearing sleeve 3 on the bearing bolt 11 and thus secures said bearing sleeve on the bearing bolt 11 in a rotatably fixed manner. The cam roller 2 is thus support so as to be rotatable with respect to the bearing sleeve 3 via the axial play 10 and the radial play 9, but is simultaneously secured by them or by their two axial flanges 4, 8, respectively, in the axial direction 14.

Figure 2:
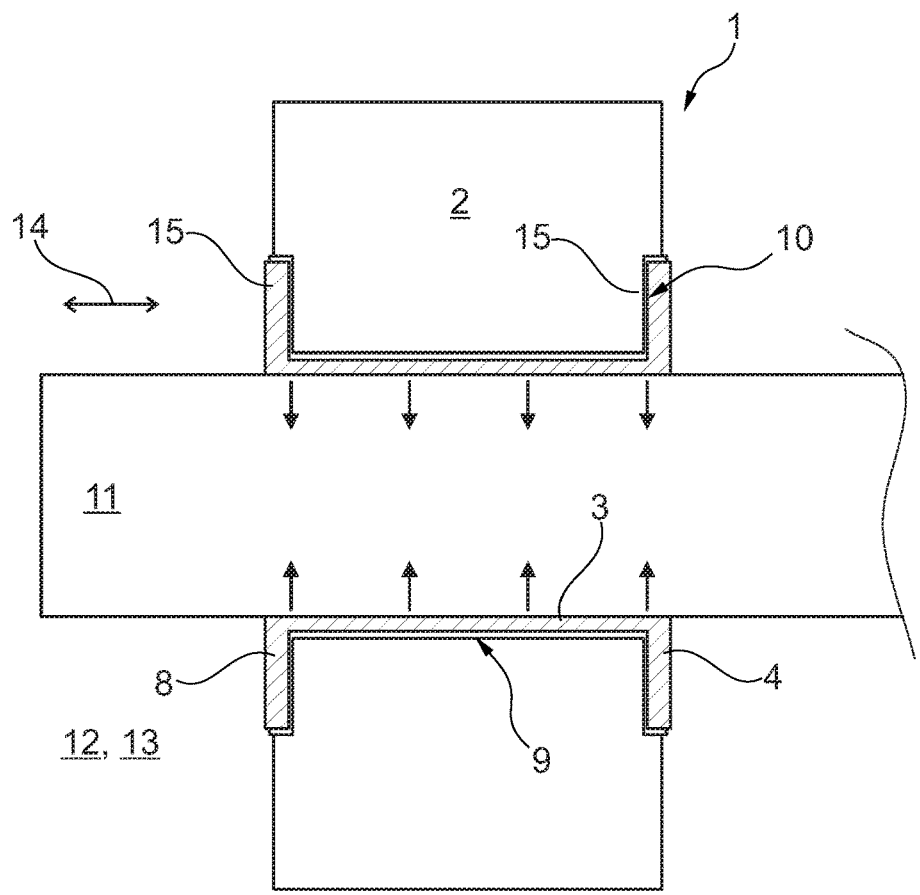
FIG. 2 shows a detailed illustration of FIG. 1D.
Figure 3:
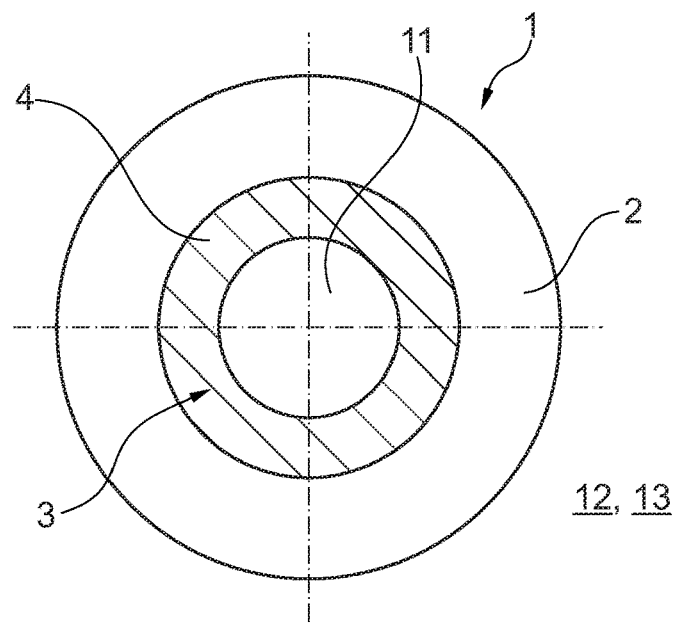
FIG. 3 shows an axial view onto FIG. 2.

On its axial front sides, the cam roller 2 shown according to FIGS. 1 and 2 thereby in each case has an annular step 15, with which the respectively corresponding axial flange 4, 8 engages so as to be at least virtually surface-aligned. An additional axial space requirement, as it was required for example in the case of the snap rings, which are currently used for the axial securing, is thus eliminated.

It is a further large advantage that the bearing bolt 11 per se no longer has to be made of a slide bearing material or has to be coated with such a slide bearing material at least area by area, as a result of the slide bearing of the cam follower, that is, of the cam roller 2 on the bearing sleeve 3. This provides for a significantly more cost-efficient production of the bearing bolt 11. As a result of the elimination of the snap rings, the variety of parts and thus also the storage and logistics costs, as well as the mounting costs, can be reduced. Even a disassembly of the roller bearing 1 from the bearing bolt 11 is possible comparatively easily as a result of a corresponding temperature treatment, and in particular also without damages, as had been unavoidable with the use of traditional snap rings for the axial securing. A replacement of a possibly defective roller bearing 1 is also possible comparatively easily in the case of a thermal joint seat as a result of a corresponding temperature treatment, because the non-positive connection between the bearing sleeve 3 and the bearing bolt 11 can be eliminated by cooling down the bearing bolt 11 or by heating the bearing sleeve 3, respectively. It goes without saying that, in the alternative, a connection between the bearing sleeve 3 and the bearing bolt 11 by means of a substance-to-substance bond is also conceivable, as well as other connecting options, provided that a rotationally fixed and axially tight securing of the bearing sleeve 3 can be ensured on the bearing bolt 11.

The invention claimed is:

1. A method for producing a roller bearing, comprising:
    inserting a bearing sleeve into a cam roller until the cam roller abuts a first axial flange of the bearing sleeve;
    inserting a counter holder into the bearing sleeve until the first axial flange of the bearing sleeve abuts a stop of the counter holder;
    heating the bearing sleeve;
    forming an opposite second axial flange via inserting a forming punch into the bearing sleeve after heating the bearing sleeve, wherein the second axial flange is formed such that the cam roller is held in the bearing sleeve with radial play and axial play after the bearing sleeve cools down; and
    removing the forming punch and the counter holder from within the bearing sleeve.

2. The method according to claim 1, further comprising securing the bearing sleeve on a bearing bolt via at least one of a thermal manner and a force fit manner.

3. The method according to claim 2, wherein securing the bearing sleeve on the bearing bolt via at least one of a thermal manner and a force fit manner includes:
    at least one of heating the bearing sleeve and cooling down the bearing bolt;
    inserting the bearing bolt into the bearing sleeve; and
    at least one of cooling the bearing sleeve and heating the bearing bolt.

4. The method according to claim 2, wherein securing the bearing sleeve on the bearing bolt via at least one of a thermal manner and a force fit manner includes securing the bearing sleeve on the bearing bolt in a rotatably fixed manner.

5. The method according to claim 2, wherein the cam roller is composed of a 100Cr6 steel.

6. The method according to claim 5, wherein the bearing sleeve is composed of a non-ferrous metal.

7. The method according to claim 1, wherein the cam roller is composed of a 100Cr6 steel.

8. The method according to claim 1, wherein the bearing sleeve is composed of a non-ferrous metal.

9. The method according to claim 1, wherein inserting the bearing sleeve into the cam roller includes guiding the bearing sleeve through a bearing opening of the cam roller.

10. The method according to claim 1, wherein forming the second axial flange via inserting the forming punch into the bearing sleeve includes inserting the forming punch into an axial side of the bearing sleeve opposite the counter holder.

* * * * *